E. WITZENMANN.
CONNECTING HOSE FOR RAILWAY CARS.
APPLICATION FILED NOV. 14, 1906.
933,516.
Patented Sept. 7, 1909.
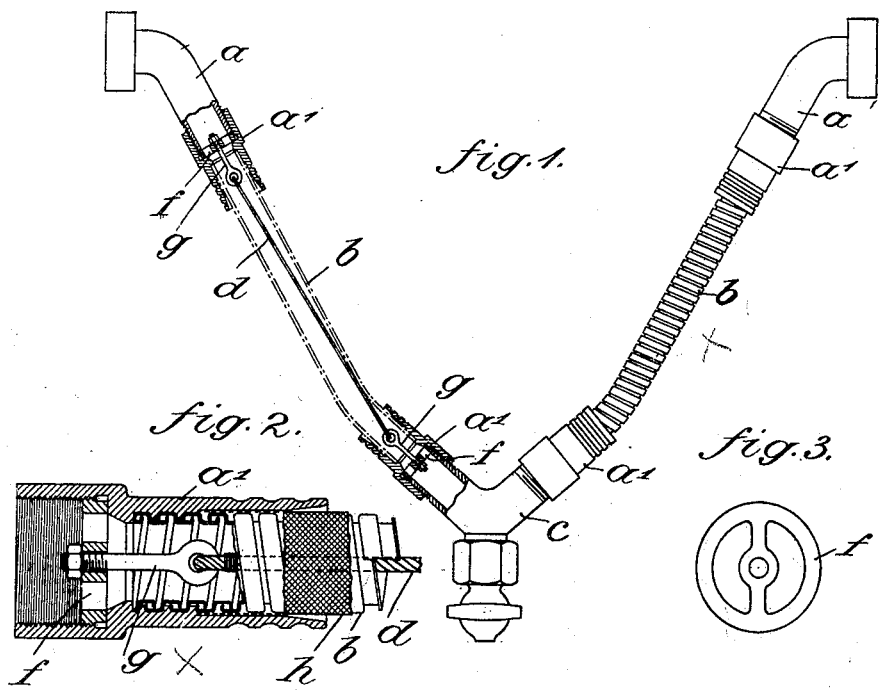
Witnesses:
P. F. Nagle.
C. D. McVay.
Inventor:
By Emil Witzenmann,
Diedersheim & Fairbanks,
Attorneys.

UNITED STATES PATENT OFFICE.

EMIL WITZENMANN, OF PFORZHEIM, GERMANY.

CONNECTING-HOSE FOR RAILWAY-CARS.

933,516.  Specification of Letters Patent.  Patented Sept. 7, 1909.

Application filed November 14, 1906. Serial No. 343,321.

*To all whom it may concern:*

Be it known that I, EMIL WITZENMANN, a subject of the Grand Duke of Baden, manufacturer, residing at No. 48 Holzgartenstrasse, Pforzheim, German Empire, have invented new and useful Improvements in Connecting-Hose for Railroad-Cars, of which the following is a specification.

My invention relates to hose such as is used on railroad cars for connecting the heating or brake pipes.

The invention consists in the provision of means for relieving the hose sections which lie between two cars from the detrimental strains to which they are subjected owing to the pull of the coupling members hanging from the hose sections.

The object in view is attained by the connecting members (on the cars) for the hose sections being connected with the pendent coupling which joins the two hose sections by wires, ropes, chains, or the like, so that the latter and not the hose parts take up the weight of the coupling parts hanging from the hose sections. This arrangement is particularly suitable for the heating or brake hose of those railroad cars in which the connection of the heating or brake pipes between the separate cars is effected by so-called metallic spiral hose, that is to say, hose which consists of a metallic band of suitable cross section wound on itself. For with such hose it is of great importance to prevent forcible sundering of the overlapping edges of the metal band.

Two forms of construction of the invention are illustrated in the accompanying drawing.

Figure 1 is a side elevation and part section of one form, in which an integral rope is employed. Fig. 2 is a longitudinal sectional view illustrating on a larger scale the means adopted for securing the hose ends to the connecting-sleeves. Fig. 3 is one of the disks by which the rope ends are held.

$a$ $a$ are the connecting-pieces for the two hose sections $b$ $b$, which are tightly screwed into the sleeves of $a^1$ of the parts $a$ $a$ and at the other end joined together by means of the coupling-piece $c$ of familiar construction, which may be provided with an outlet cock. The hose sections $b$ $b$ are relieved from strain by the connecting-pieces $a$ $a$ being joined with the coupling-piece $c$ by means of ropes $d$ or the like located inside the hose. The connection of the parts $a$ $c$ by means of the ropes $d$ may be effected, for instance, as shown in Fig. 2, by disks $f$ (Fig. 3), being screwed into the sleeves $a^1$ of the connecting-pieces $a$ and of the coupling $c$, and by eye bolts $g$ being passed through the said disks.

It will be observed, the hose sections $b$ $b$ are entirely relieved from strain, so that there is no danger of the overlapping edges of the metal band forming the hose being injured. The hose sections $b$ $b$ may be protected by a plaited or like covering $h$ (Fig. 2) if desired.

Having thus described my invention, what I claim as new and desire to secure by Letters Patent of the United States is:—

In heating or brake pipes for railroad cars and the like, the combination of hose sections, connecting pieces at the outer ends of said sections, sleeves into which the ends of the hose sections are tightly screwed, a coupling piece having branches screwed into adjacent sleeves, means for relieving the hose sections of strain, comprising flexible means disposed within the hose sections and disks having threaded engagement with said sleeves of the connecting pieces and of the branches of the coupling, and means passed through said disks and to which the ends of the flexible means are directly connected.

In witness whereof I have hereunto signed my name this twenty-fifth day of October, 1906, in the presence of two subscribing witnesses.

EMIL WITZENMANN.

Witnesses:
ERNST ENTENMANN,
WM. HAHN.